United States Patent [19]
Nihei et al.

[11] Patent Number: 5,570,609
[45] Date of Patent: Nov. 5, 1996

[54] INDUSTRIAL ROBOT PROVIDED WITH MEANS FOR SETTING REFERENCE POSITIONS FOR RESPECTIVE AXES

[75] Inventors: Ryo Nihei; Akihiro Terada, both of Fujiyoshida; Kyozi Iwasaki, Hachioji; Hikaru Yamashiro, Yamanashi, all of Japan

[73] Assignee: Fanuc Ltd., Yamanashi, Japan

[21] Appl. No.: 295,790

[22] PCT Filed: Jan. 13, 1994

[86] PCT No.: PCT/JP94/00040

§ 371 Date: Mar. 8, 1995

§ 102(e) Date: Mar. 8, 1995

[87] PCT Pub. No.: WO94/15761

PCT Pub. Date: Jul. 21, 1994

[30] Foreign Application Priority Data

Jan. 13, 1993 [JP] Japan ................................. 5-004244

[51] Int. Cl.$^6$ ............................................... B25J 17/00
[52] U.S. Cl. ............................ 74/490.05; 901/28; 901/50
[58] Field of Search .................... 74/490.05; 901/28, 901/29, 50

[56] References Cited

U.S. PATENT DOCUMENTS

| 4,372,721 | 2/1983 | Harjar et al. ............... 901/4 X |
| 4,702,665 | 10/1987 | Nakashima et al. ............... 901/50 X |
| 4,813,844 | 3/1989 | Torii et al. ............... 901/50 X |
| 4,892,457 | 1/1990 | Bartlett et al. ............... 901/50 X |
| 5,060,533 | 10/1991 | Torii et al. ............... 901/28 X |

FOREIGN PATENT DOCUMENTS

| 2-126791 | 10/1990 | Japan . |
| 2-285898 | 11/1990 | Japan ............... 901/28 |
| 1484691 | 6/1989 | U.S.S.R. ............... 901/50 |

Primary Examiner—Allan D. Herrmann
Attorney, Agent, or Firm—Nikaido Marmelstein Murray & Oram LLP

[57] ABSTRACT

An articulated industrial robot provided with a reference position setting means which includes two positioning contact parts 22 and 24, and the reference position setting means is provided for each joint 16 of a robot unit 10 in such a manner that the positioning contact parts 22 and 24 are brought into contact with each other so as to perform determination of a geometrical reference position for each joint drive source after the replacement of a defective drive motor or a defective reduction gear of the joint drive source. The determined geometrical reference position regarding each of the joint axes are stored in the robot controller to thereby achieve a single-axis mastering, and thus the reference position setting means simplifies single-axis mastering with respect to each joint axis of the robot unit without being subject to any spatial restrictions.

4 Claims, 3 Drawing Sheets

ALIGNMENT MARKS 5,570,609

INDUSTRIAL ROBOT PROVIDED WITH MEANS FOR SETTING REFERENCE POSITIONS FOR RESPECTIVE AXES

TECHNICAL FIELD

The present invention relates to an improvement to an industrial robot and, more particularly, to a multi-articulated industrial robot having a plurality of joint axes on which joint drive sources, which include drive motors and reduction gears, are mounted for driving the movable elements of the robot, the robot being further provided with a geometrical reference position setting means capable of simply restoring the original reference positions of respective drive sources about respective joint axes after a drive motor or motors and/or a reduction gears or gear have been replaced.

BACKGROUND ART

Generally, each joint of a multi-articulated industrial robot is conventionally provided with joint drive sources which include drive motors and reduction gears. The operation of the joint drive sources is controlled by a robot controller according to programs, stored in the robot controller, to cause relative displacements between movable elements about corresponding joint axes so that the accumulated relative displacement causes an end effector mounted on the wrist of the robot, i.e., the endmost movable element, to implement a desired operation.

In the described industrial robot, it often occurs at the job site that a drive motor or an associated reduction gear in a joint drive source malfunctions and must be replaced with a new motor or reduction gear.

In such a case, the defective operating element of the malfunctioning joint drive source, i.e., the drive motor or the reduction gear, is removed from the robot unit, and then a new drive motor or reduction gear is mounted on the robot unit to restore the joint drive source to its normal function.

In order to enable the industrial robot to perform any desired robot motion correctly, according to the program in the controller, after the defective drive motor or the defective reduction gear has been replaced with a new one, the geometrical positions of any two movable elements of the robot cooperatively joined together, for motions relative to each other, by the joint in which the drive motor or the reduction gear has been replaced with a new one must be unchanged from those before the replacement of the drive motor or the reduction gear, and the geometrical positions of the movable elements must be correctly taught to the entire system of the robot after completion of the replacement. The two movable elements of the robot are the robot body and the robot upper arm, the robot upper arm and the robot forearm, the robot forearm and the robot wrist, or the different parts of the robot wrist.

That is, the position before replacement, (original position) must be correctly restored and must be correctly taught to the robot.

Accordingly, original position adjustment, namely single-axis mastering, has conventionally been carried out.

The conventional single-axis mastering procedure applied to a multi-articulated industrial robot provided with a robot base 1, a robot body 2 capable of revolving about a joint axis (J1) relative to the robot base 1, a robot upper arm 3 capable of turning about a joint axis (J2) relative to the robot body, a robot forearm capable of turning about a joint axis (J3), supported on the extremity of the robot upper arm 3 relative to the robot upper arm 3, and a robot wrist 5 having three joint axes (J4 through J6) and three degrees of freedom of motion as shown in FIG. 2 will be described by way of example.

When a drive motor Mu of a drive source for driving the robot forearm 4 for rotating about the joint axis J3 malfunctions and it must be replaced with a normal one, the robot forearm 4 is rotated about the joint axis J3 relative to the robot upper arm 3 to bring a reference position P on the robot forearm 4, for original position setting, into contact with the tip of the arm of a dial indicator 9 fixedly held by a magnetic stand or the like on a measuring table 8.

In this state, the measurement indicated by the indicator hand of the dial indicator 9 is recorded, the geometrical position data U corresponding to the position of the joint axis J3 is read from a position detector incorporated in the drive motor Mu before replacement and the geometrical position data U is recorded.

The robot forearm 4 is then rotated about the joint axis J3 away from the dial indicator 9 relative to the robot upper arm 3, leaving the dial indicator 9 as it stands. Subsequently, the defective motor Mu is replaced with a new drive motor Mu. The robot forearm 4 is thereafter rotated to bring the reference position P into contact with the tip of the arm of the dial indicator 9 held on the measuring table 8 so that the indicator hand indicates the measurement indicated by the same before replacement. The geometrical position of the robot forearm 4 is thus guaranteed by the indication on the dial indicator 9. Then, the previously recorded geometrical position data U is given to the position detector (encoder) of the newly installed drive motor Mu via the robot controller, by operating the operating panel of the robot controller to complete the single-axis mastering for the joint axis J3. Thus, the same functions as before are restored and the industrial robot can perform desired robot operation.

As for the joint axis J2, when the drive motor or the reduction gear incorporated in the joint having the joint axis J2 malfunctions and must be replaced, a single-axis mastering procedure using the dial indicator 9 similar to the foregoing single-axis mastering procedure is carried out on the basis of geometrical position data W, as shown in FIG. 2.

Another conventional single-axis mastering procedure, which is different from the foregoing single-axis mastering procedure using the measuring table 8 and the dial indicator 9, uses alignment marks Q1 and Q2, as shown in FIG. 3, marked respectively on two members that move relative to each other on a joint, and uses the positions of the two members where the alignment marks Q1 and Q2 coincide with each other as the geometrical reference position of one of the two members relative to the other. When the drive motor or the reduction gear of a driving source for driving the joint malfunctions and must be replaced, position data corresponding to the geometrical reference position of the member, i.e., the position of the member in a state where the alignment marks Q1 and Q2 coincides with each other, is read from the position detector of the drive motor and the position data is recorded, the position of the member is adjusted after the replacement of the drive motor or the reduction gear with a normal one so that the alignment marks Q1 and Q2 coincide with each other to position the member at the geometrical reference position, and then the position data corresponding to the geometrical reference position is given by operating the control panel of the robot controller.

However, in carrying out the first single-axis mastering procedure employing the dial indicator 9 described with reference to FIG. 2, the dial indicator for positioning the robot member at the geometrical reference position before and after the replacement of the defective drive motor or the like must be kept in an absolutely stationary state during the replacement work for replacing the drive motor or the like.

If the dial indicator is moved inadvertently during the replacement of the drive motor or the like, the geometrical reference position is lost and single-axis mastering becomes impossible. Consequently, the single-axis mastering procedure must be executed for all the joint axes to restore the functions necessary for executing the desired programs taught to the robot unit, which takes a very long time.

Furthermore, often there is no place suitable for firmly placing the measuring table for fixedly holding the dial indicator 9 in the job site in which the industrial robot operates and, in such a case, a single-axis mastering procedure using the dial indicator cannot be carried out.

When carrying out the second single-axis mastering procedure using the alignment marks Q1 and Q2 shown in FIG. 3, the coincidence of the alignment marks Q1 and Q2 is confirmed visually by an operator. Therefore, it often occurs that the geometrical position determined after the replacement of the defective drive motor or the defective reduction gear of the joint drive source deviates minutely from the geometrical position before the replacement of the defective drive motor or the defective reduction gear. Accordingly, a teaching operation, which is a time-consuming operation, must be performed to correct the program in the controller after the replacement work.

DISCLOSURE OF THE INVENTION

Accordingly, a principal object of the present invention is to provide an industrial robot provided with reference position setting means for setting reference positions on respective joint axes, enabling the robot to perform single-axis mastering simply and without requiring an excessively large space at the job site where the industrial robot is used or in the manufacturing plant where the industrial robot is manufactured and assembled.

Another object of the present invention is to provide an industrial robot provided with reference position setting means for setting reference positions on respective joint axes, without using any external equipment such as dial indicators, measuring tables and such.

In accordance with the present invention, there is provided an industrial robot provided with reference position setting means for setting reference positions on respective joint axes, each capable of restoring the original reference position of a joint drive source with respect to a corresponding joint axis after a component of the joint drive source has been replaced. Each of the reference position setting means comprises a first positioning contact part provided on one of two movable robot members joined together by a joint and capable of rotating about the joint axis of the joint for relative displacement, and a second positioning contact part provided on the other movable robot member so as to be able to come in contact with the first positioning contact part when one of the two movable robot members is rotated for displacement relative to the other to a position within or outside a range of relative displacement.

Preferably, either the first positioning contact part or the second positioning contact part of the reference position setting means connected with the joint axis is a mechanical protrusion formed on one of the movable robot members, and the other is a positioning member detachably attached to the other movable robot member.

When the reference position setting means is disposed outside the range of relative displacement in which one of the two movable robot members rotates relative to the other for relative displacement about the joint axis, i.e., the range of stroke, the first and second positioning contact parts may be protrusions capable of coming into contact with one another.

When the drive motor or the reduction gear of the joint drive source connected with any one of the joint axes of the industrial robot having the foregoing constitution malfunctions and must be replaced, one of the two movable robot members is rotated relative to the other and is set at a geometrical reference position, in which the first and the second positioning contact parts of the reference position setting means are in contact with one another, position data corresponding to the geometrical reference position, such as an angular position data, is read from the position detector for the drive motor, replacement work for replacing the defective drive motor or the defective reduction gear with a normal one is conducted at an appropriate place, one of the two movable robot members is moved manually or by operating a teaching board or a control panel relative to the other so that the first and second positioning contact parts come into contact with one another to set the former movable robot member at the geometrical reference position, and then the position data corresponding to the geometrical reference position of the former movable robot member is given to the position detector for the newly installed drive motor, via the robot controller to complete single-axis mastering.

As is apparent from the foregoing description, according to the present invention, any errors attributable to observations made by the operator are not introduced into single-axis mastering, and single-axis mastering can be achieved without using any external equipment such as dial indicators or measuring tables. Accordingly, single-axis mastering can be easily achieved by a simple procedure even at a job site where the industrial robot is used.

BRIEF DESCRIPTION OF THE DRAWINGS

The above and other objects, features and advantages of the present invention will become more apparent from the ensuing description taken in conjunction with the accompanying drawings, wherein.

BEST MODE OF CARRYING OUT THE INVENTION

Figure 1:
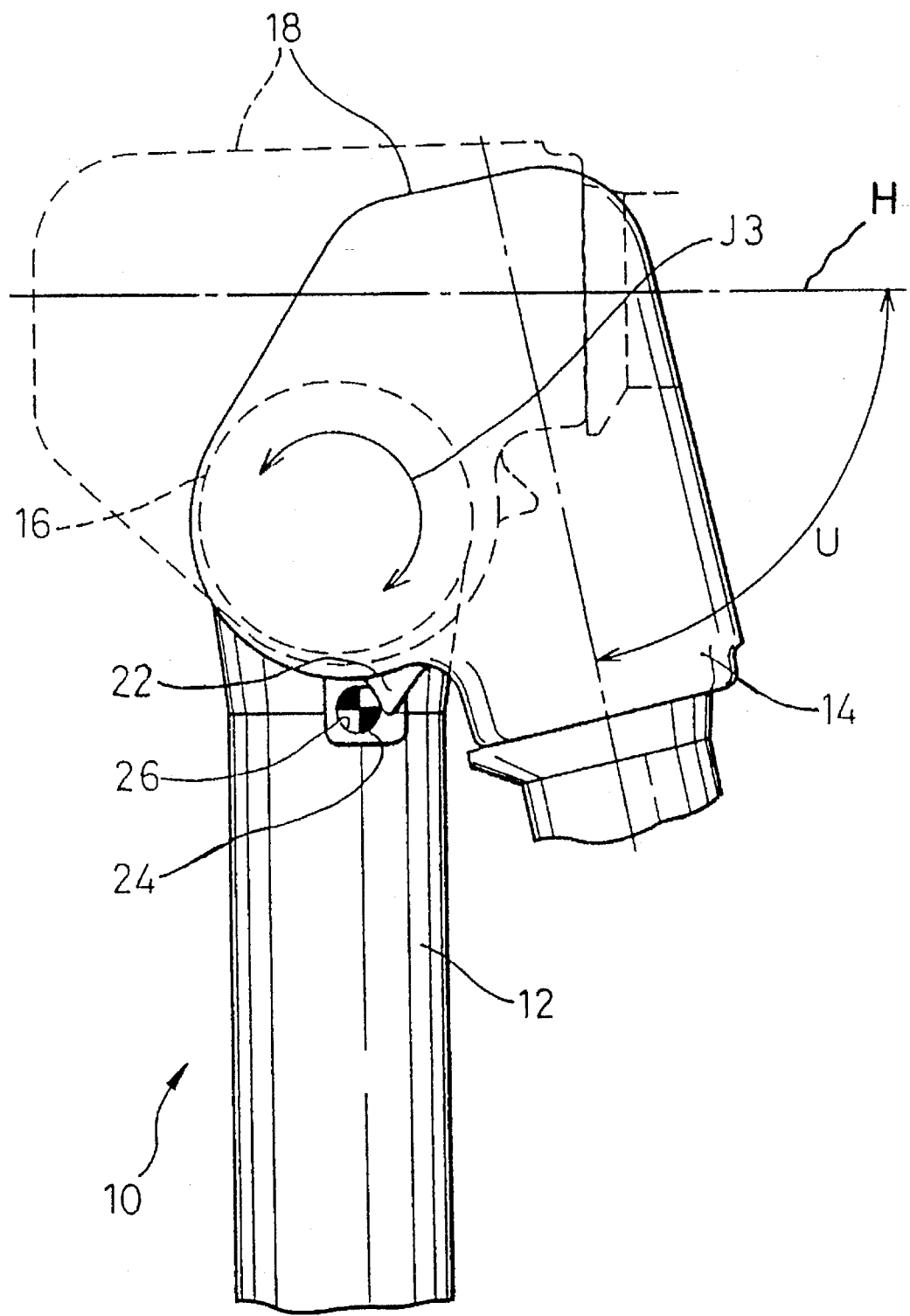
FIG. 1 is an enlarged, fragmentary side view of a reference position setting means according to a preferred embodiment of the present invention, incorporated into a joint, having a joint axis, of an industrial robot, particularly a multi-articulated industrial robot.
Figure 2:
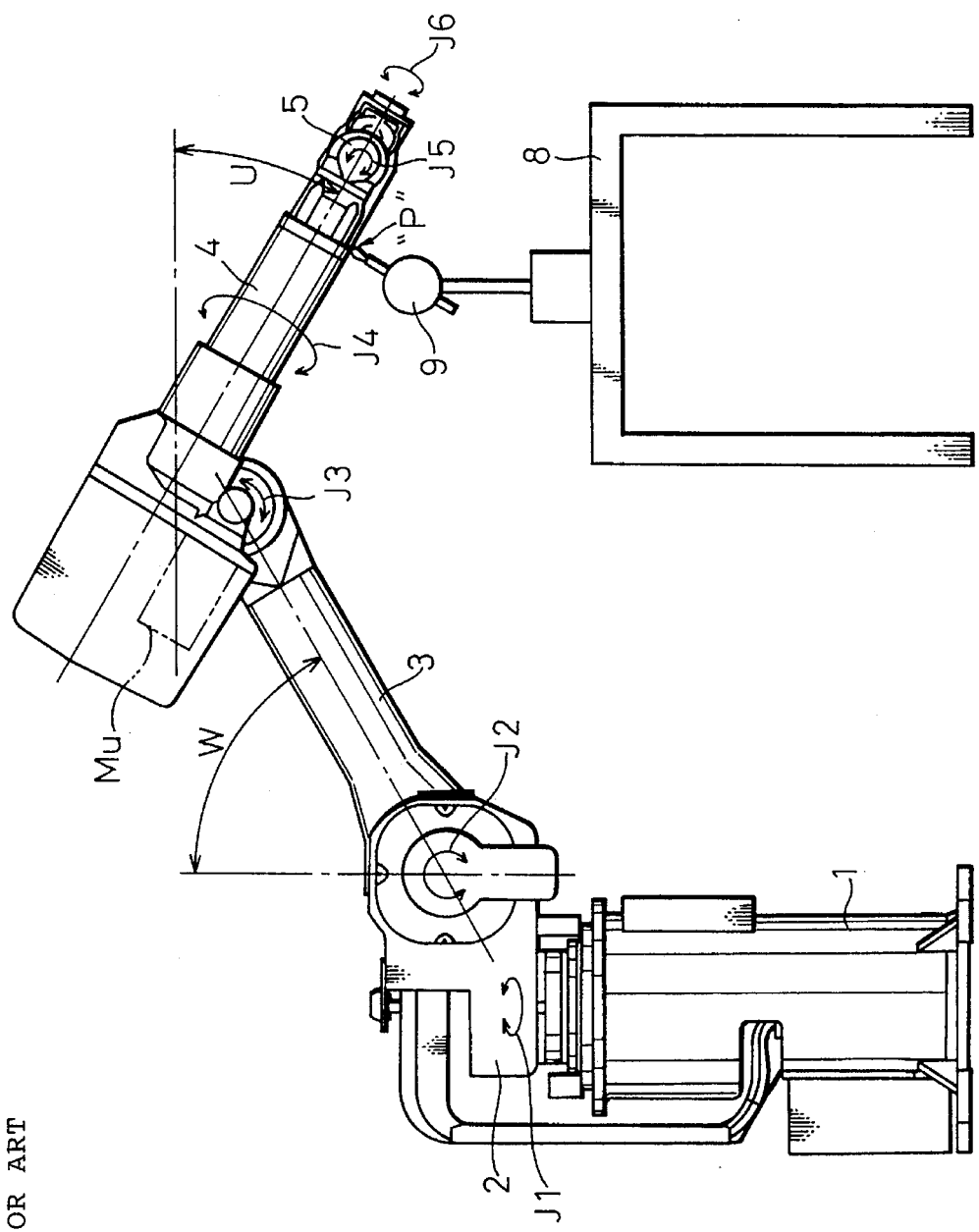
FIG. 2 is a side view of assistance in explaining the general construction of an articulated industrial robot and a conventional single-axis mastering procedure.
Figure 3:
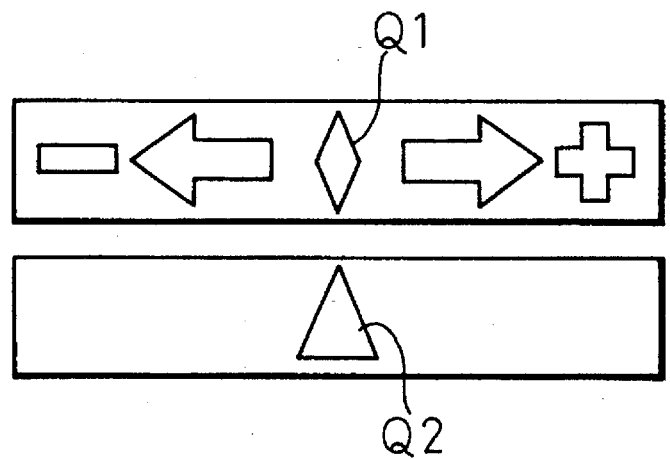
FIG. 3 is a schematic pictorial view of alignment marks employed in a conventional single-axis mastering procedure.

FIG. 1 shows, in an enlarged, fragmentary view, a reference position setting means incorporated into an industrial robot, more specifically, into an articulated industrial robot, in a preferred embodiment according to the present invention. The position setting means is connected with one of the joints of the articulated industrial robot. A robot upper arm 12, i.e., a first arm, and a robot forearm 14, i.e., a second arm, accommodated in the robot unit 10 of the articulated industrial robot are joined together by a joint 16 having a joint axis J3 so that the robot forearm 14 is able to turn about the joint axis J3 relative to the robot upper arm 12 for, for example, turning in a vertical plane relative to a horizontal line H. In FIG. 1, the robot forearm 14 has been rotated through an angle U from a position indicated by dotted lines, parallel to the horizontal axis H to a position indicated by continuous lines declining to the horizontal axis H.

The robot forearm 14 can be rotated in a vertical plane for motions necessary for carrying out desired robot functions according to a program stored in a robot controller, not shown, relative to the robot upper arm 12 in a fixed range of motion (range of stroke). Naturally, the robot forearm 14 can be rotated beyond the limits of the fixed range of motion when a braking means for braking a drive motor connected with the joint 16 is removed.

A drive motor and a reduction gear, included in a joint driving source for driving the joint 16 to turn the robot forearm 14 relative to the robot upper arm 12, are housed in a housing 18 attached to the rear end of the robot forearm 14, and the robot forearm 14 is driven for turning in a vertical plane by the joint driving source comprising the drive motor and the reduction gear.

In this embodiment, a protrusion 22 in a lump-shaped member is formed on a rear portion of the robot forearm 14, and an attaching hole 26, capable of detachably receiving a positioning member 24 that can come into contact with the protrusion 22 of the robot forearm 14, is formed at a predetermined position in an upper portion of the robot upper arm 12.

In FIG. 1, the positioning member 24 is fitted in the attaching hole 22, the robot forearm 14 is at the position indicated by continuous lines and the protrusion 22 is in contact with the positioning member 24.

The protrusion 22 and the positioning member 24 serve as a reference position setting means for setting a geometrical reference position for single-axis mastering with respect to the joint axis J3. As mentioned above, when the protrusion 22 of the robot forearm 14 comes into contact with the positioning member 24 attached to the robot upper arm 12, the robot forearm 14 is set at the reference position. The positioning member 24 is a rod-shaped member having a cylindrical part of a given diameter. The positioning member 24 may be attached to the robot upper arm 12 by fitting or by using an attaching flange.

When the drive motor or the reduction gear of the joint drive source of the industrial robot provided with the reference position setting means including the protrusion 22 and the positioning member 24 malfunctions and must be replaced, the robot forearm 14 is first set at the geometrical reference position by slowly rotating the robot forearm 14 relative to the robot upper arm 12 to bring the protrusion 22 into light contact with the positioning member 24 before replacement. Then, position data corresponding to the position of the robot forearm 14 set at the geometrical reference position is read from the position detector of the drive motor and the positional datum data is recorded. Subsequently, the robot forearm 14 is moved to a position where the defective drive motor or the defective reduction gear can easily be replaced with a new one, and the defective drive motor or the defective reduction gear is replaced. After the completion of the replacement work, the robot forearm 14 is turned relative to the robot upper arm 12 to set the robot forearm 14 at the geometrical reference position by bringing the protrusion 22 of the robot forearm 14 into contact with the positioning member 24 of the robot upper arm 12.

After thus setting the robot forearm 14 at the geometrical reference position, the position data corresponding to the geometrical reference position of the robot forearm 14 is given to the position detector of the newly installed drive motor, via the robot controller, by operating the control panel of the robot controller.

In the foregoing single-axis mastering procedure, the position data corresponding to the geometrical reference position of the robot forearm 14 is read from the position detector of the drive motor and is recorded before replacement.

However, it is also possible to set the geometrical reference position with respect to respective joint axes (for example, the joint axes J1 to J6 of a six-axis industrial robot) by the method of single-axis mastering by employing the protrusion 22 and the positioning member 24 before the robot is shipped from the manufacturing plant so that the data of the geometrical reference position is recorded as shipping data. Then, the recorded shipping data may be later used for carrying out setting of the geometrical reference positions of respective joint axes of the robot by using the protrusion 22 and the positioning member 24 when replacement of any defective drive motor or defective reduction gear must be done at the job site at which the multi-articulated industrial robot is used. Namely, the use of the recorded shipping data can eliminate a necessity for the afore-mentioned reading of the geometrical reference position data before the replacement of the defective drive motor or reduction gear with a new drive motor or reduction gear. Thus, the setting of the reference positions of respective joint axes after replacement can be simply achieved by the employment of the protrusion 22 and the positioning member 24 of the reference position setting means at the site of using the industrial robot. The recorded geometrical reference position data can be easily stored in the robot controller and in the position detector of the drive motor by operating the control panel.

Although the geometrical reference position setting means necessary for setting the robot forearm 14 at the geometrical reference position about the joint axis J3 relative to the robot upper arm 12 by single-axis mastering has been described by way of example, naturally, the other joints of the multi-articulated industrial robot can be provided with similar geometrical reference position setting means, and the robot member connected with any one of the joints can be set at a specified geometrical reference position, when the drive motor or the reduction gear of a joint drive source for driving the same joint malfunctions and must be replaced with a new one, by single-axis mastering, to restore the original operating functions of the multi-articulated industrial robot.

Furthermore, it is also possible to attach the positioning member 24 detachably to the robot forearm 14 and to form the protrusion 22 in the upper portion of the robot upper arm 12 so as to be brought into contact with the positioning member 24 instead of detachably attaching the positioning member 24 to the robot upper arm 12 and forming the protrusion 22 in the rear portion of the robot forearm 14.

The robot operation is not obstructed, if the attaching hole 26 for receiving the positioning member 24 is formed within the range of stroke of the robot forearm 14 relative to the robot upper arm 12, when the positioning member is removed from the robot upper arm 12 after completing single-axis mastering.

However, when the geometrical reference position setting means is disposed outside the range of stroke of one of the two robot members relative to the other, for example, both the robot upper arm 12 and the robot forearm 14 may be provided with protrusions able to come into contact with each other when the former robot member is rotated to a geometrical reference position outside the range of stroke.

Naturally, it is also possible to form attaching holes in both the two robot members to receive positioning pins detachably therein, and to bring positioning pins fitted in the attaching holes into contact with each other to position one of the robot members at a geometrical reference position relative to the other by single-axis mastering.

As is apparent from the foregoing description, according to the present invention, the geometrical reference position setting means comprising a protrusion and a pin-shaped positioning member, two protrusions, or two positioning members attached to or formed on the two movable robot members joined together for relative displacement by each joint of the robot unit, respectively, is incorporated into the same joint to carry out single-axis mastering with respect to the joint axis of the joint. Therefore, single-axis mastering can simply be carried out without requiring any auxiliary tools, such as dial indicators, when replacing the defective drive motor or the defective reduction gear of the joint drive source at the job site at which the articulated industrial robot is used.

Furthermore, since the movable robot member can be set at its geometrical reference position by bringing two machine parts into contact with each other instead of setting the movable robot member at the geometrical reference position through the visual adjustment of the positions of the alignment marks which are employed in the conventional geometrical reference position setting means, single-axis mastering can more accurately be achieved as compared with conventional single-axis mastering.

Still further, since single-axis mastering can be achieved by means of the geometrical reference position setting means in accordance with the present invention even if only a small space is available at the job site where the industrial robot is used, the defective component of the joint driving source can simply be replaced with a normal one and subsequent single-axis mastering can be achieved without being subject to any spatial restrictions.

We claim:

1. An industrial robot provided with a reference position setting means for setting reference positions for respective joint axes, the reference position setting means being capable of restoring an original reference position for each joint drive source after the joint drive source has been replaced with a corresponding new joint drive source;

characterized in that said reference position setting means comprises:

a first positioning contact part provided on one of two movable members joined together about each joint axis so as to perform a relative displacement therebetween within a range of displacement, said first positioning contact part being arranged at a position located inside or outside the extremities of said range of displacement of said two movable; members and a second positioning contact part provided on the other of said two movable members so as to be brought into contact with said first positioning contact part in response to relative displacement of said two movable members about said joint axis thereof.

2. An industrial robot provided with a reference position setting means according to claim 1, wherein one of said first and second positioning contact parts of said reference position setting means comprises a protrusion formed in one of said two movable members, and said other of said positioning contact parts comprises a positioning pin capable of being detachably attached to said other movable member.

3. An industrial robot provided with a reference position setting means according to claim 2, wherein said positioning pin can be detachably fitted in a pin-engagement hole formed in said other movable member.

4. An industrial robot provided with a reference position setting means according to claim 1, wherein said reference position setting means is arranged inside the extremities of said range of displacement of said two movable members constituting two movable robot members.

\* \* \* \* \*